United States Patent
Luick

(10) Patent No.: US 6,993,668 B2
(45) Date of Patent: Jan. 31, 2006

(54) METHOD AND SYSTEM FOR REDUCING POWER CONSUMPTION IN A COMPUTING DEVICE WHEN THE COMPUTING DEVICE EXECUTES INSTRUCTIONS IN A TIGHT LOOP

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/184,412

(22) Filed: Jun. 27, 2002

(65) Prior Publication Data

US 2004/0003298 A1  Jan. 1, 2004

(51) Int. Cl.
*G06F 1/32* (2006.01)
*G06F 1/30* (2006.01)
(52) U.S. Cl. .................. 713/320; 713/323; 713/324
(58) Field of Classification Search ............... 713/320, 713/323, 324, 322, 310; 712/205, 241; 711/205, 711/206, 207, 138; 365/227

See application file for complete search history.

(56) References Cited

U.S. PATENT DOCUMENTS

| | | | | | |
|---|---|---|---|---|---|
| 5,617,348 | A | * | 4/1997 | Maguire | 365/49 |
| 5,991,848 | A | * | 11/1999 | Koh | 711/3 |
| 6,026,476 | A | * | 2/2000 | Rosen | 711/206 |
| 6,279,083 | B1 | * | 8/2001 | MacDonald | 711/138 |
| 6,678,815 | B1 | * | 1/2004 | Mathews et al. | 711/205 |
| 6,772,355 | B2 | * | 8/2004 | Homewood et al. | 713/320 |

OTHER PUBLICATIONS

Lee et al, Instruction Fetch Energy Reduction Using Loop Caches For Embedded Applications with Small Tight Loops, Aug. 1999, IEEE, pp. 267-269.*

* cited by examiner

*Primary Examiner*—Thomas Lee
*Assistant Examiner*—Suresh K Suryawanshi
(74) *Attorney, Agent, or Firm*—Bockhop & Associates LLC

(57) ABSTRACT

A system and methods for reducing power consumption in a computing device during the execution of a tight loop. When a tight loop is detected, the data cache and the translation look-aside buffer are powered off until the end of the loop. The instruction cache and the branching unit are also powered off, except for monitoring the end of the loop condition.

6 Claims, 4 Drawing Sheets

SAXBY Loop Example: W C Example (4 Issue) (2 L/ST)

METHOD AND SYSTEM FOR REDUCING POWER CONSUMPTION IN A COMPUTING DEVICE WHEN THE COMPUTING DEVICE EXECUTES INSTRUCTIONS IN A TIGHT LOOP

BACKGROUND OF THE INVENTION

1. Field of the Invention

The present invention relates to computer hardware and more specifically relates to power consumption in a microchip.

2. Description of the Prior Art

As computer speed and computational power increase with advancing technologies, computing devices consume more power and emit more heat. This power problem is especially apparent in general purpose computers, where the computer architecture is designed to solve generic problems. General purpose superscalar computers typically are optimized to assume random instruction sequences that can contain uncorrelated and nonrepetitive instructions that load and store from one cycle to the next, where each cycle requires unique address translations and cache directory searches.

A general purpose computer architecture, such as a reduced instruction set computer (RISC), designed to solve generic problems performs its functions well, however, it does not consume power efficiently. For example, in a RISC-based computer during the execution of special scientific applications that involve tight loops, many components in the computer are not actively used, but nevertheless consume power and emit heat.

One example of a tight loop is when a central processing unit (CPU) has all the instructions in the loop in its internal registers and does not need to fetch any additional instructions, and the CPU needs only fetch operands for it to operate on.

One example of a primary problem in scientific computing involves long execution of tight loops such as a DAXBY floating point multiply add loop. In such an operation, the utilization of all units required is very near 100% for long periods (milliseconds). The heat generated can be greater than can be absorbed by the thermal constant of a silicon chip.

An example of DAXBY 100 is illustrated in FIG. 1. The example illustrates a tight loop of five instructions:

LFDU—Load Float Double with Update (operand 1)
LFDU'—Load Float Double with Update (operand 2)
FMADD—Float Multiply Add
STFDU—Store Float Double with Update
BC—Branch Conditional In a RISC-based computer, when this loop is executed, instructions are fetched from an instruction cache (Icache) and operands are fetched from a data cache (Dcache). The address of operands is stored in a register during the execution cycle and the result of calculation is stored in a register. The result in the register is read a few cycles later and sent to the Dcache, from where it is written back to the memory. The registers are mostly used for timing purposes during the execution cycle and separate memory access from the actual computation.

The clock gating of unused components is, in general, of no value for the loop case. Some components, such as a translation look-aside buffer (TLB), the data cache directory and the instruction cache (Icache) can account for a significant amount of power in the tight loop case.

For the tight loop case, where there is almost 100% of utilization of all units, the power and power density can be too high and would greatly limit the operating frequency of the processor core. The excessive power consumption and heating cause a severe cooling and reliability problem.

Therefore, there is a need for a system to reduce power consumption for loop codes.

SUMMARY OF THE INVENTION

The present invention discloses a system for reducing power consumption in a computing device during the execution of a tight loop. A previous effective address register and an effective address comparator are provided according to one embodiment of the present invention. The high order bits of the effective address (the highest order 52 bits) for a next operand is compared with the highest order bits of the effective address of the current operand and, if they match and there is no carry, then no data cache directory access nor TLB translation is needed. The low order 12 bits of the real address is obtained by incrementing the low order bits of the last real address by one stride. Alternatively, if it can be determined that the stride is less than the page size, then all that need be done is to determine that there was no carry out of the 12 bit incrementer on the low order 12 bits of the effective address. By reducing unnecessary Dcache directory accesses and TLB translations, these units can be disabled, thus reducing the power consumption.

In another aspect, the invention discloses a similar approach for reducing access to the instruction cache. According to another embodiment of the present invention, for stride 1 tight loop, loop instructions are loaded into an instruction buffer, and no further access to the instruction cache is needed during the duration of the loop. Thus, the Icache can be disabled.

In yet another aspect, the invention discloses an approach for reducing power consumption in a branching circuit. For a tight loop calculation, a branching logic unit is divided into several clock domains, and only the clock domain that monitors a loop counter needs to be enabled, while the rest of the branching logic can be disabled. The branch address generator can also be disabled.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
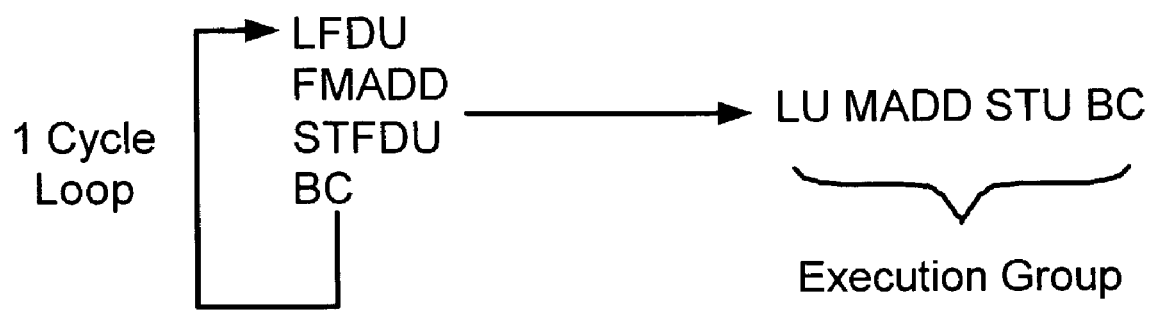
FIG. 1 is an illustration of a tight loop with four floating point instructions.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

In the tight loop, such as a scientific loop, the processor strides through a memory or a cache array in a stride 1 situation, wherein one operand directly follows another. Each operand in floating point calculations is typically four bytes long or eight bytes long, and eight byte operands are more dominant. For floating point calculations in the stride 1 situation, one operand is eight bytes away from the next one, and an address register is incremented accordingly for each access.

The present invention discloses a system for recognizing a tight loop computation and avoiding repetitive access to registers for the purpose of obtaining the location of next operand. In one embodiment of the present invention, the system, after recognizing the tight loop calculation by examining the instructions as they come in from the Icache or an instruction buffer and a backward branch, which forms a tight loop that is totally contained in the instruction buffer. A typical instruction buffer is about one Icache line of 128 bytes, or 32 instructions. This loop detection avoids additional access to the Icache because the instructions are in the instruction buffer. Longer size strides can always be reconfigured to produce a stride 1 loop for computation.

Upon further examination of the instructions, the system recognizes the instructions as load with update or store with update. The load with update instruction typically loads an operand from the Dcache into a register and increments the address register by eight bytes for the next operand. Similarly, the store with update instruction stores the result into the Dcache and increments the address register. Given that the system recognizes it is in a stride 1 or small stride tight loop situation, the system knows that the next operand is one stride away from the current operand. Therefore, the system avoids reading the address register, incrementing it by stride 1, and storing it back by incrementing a small temporary offset register that has the address.

Figure 2:
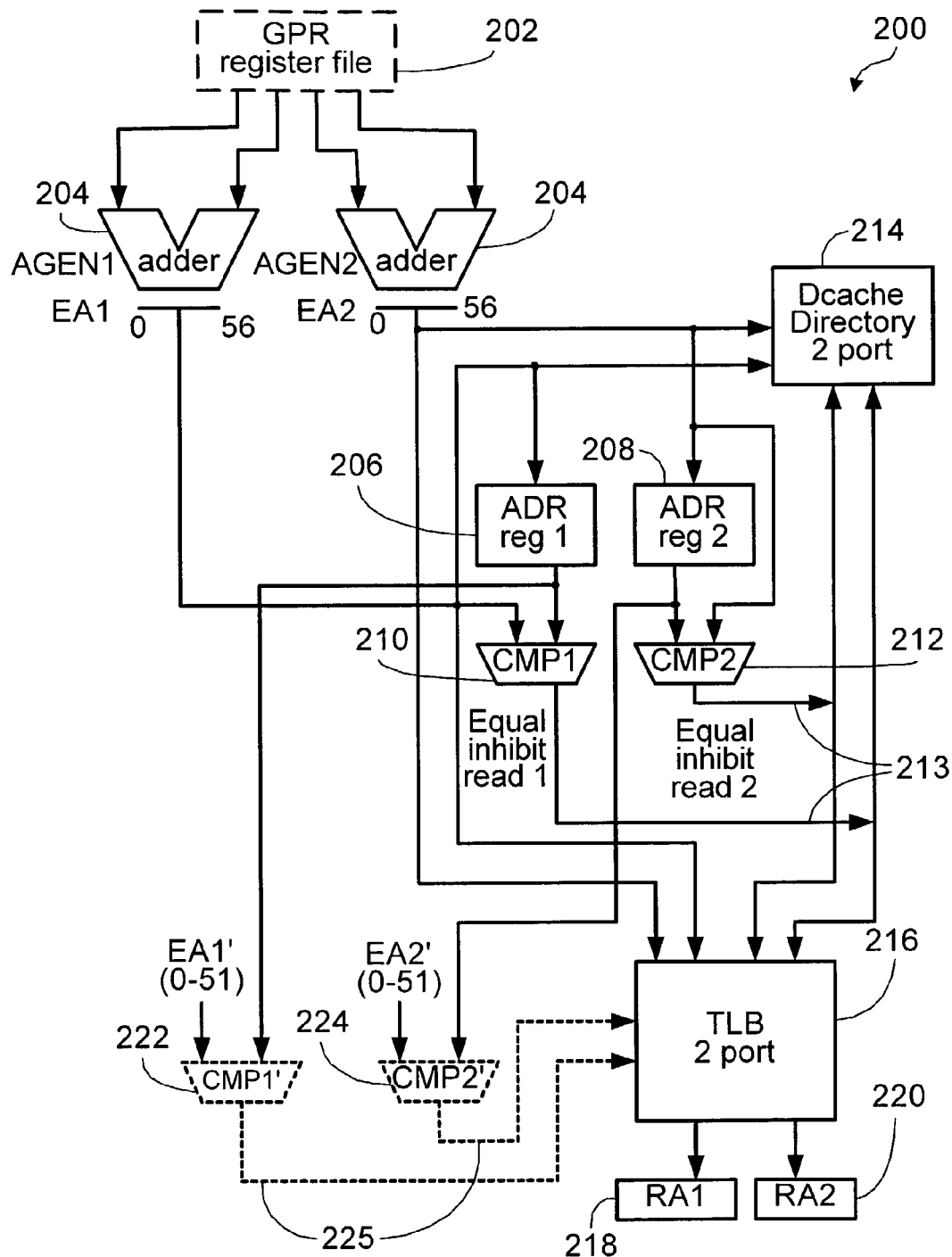
FIG. 2 is a schematic of a computer architecture according to the present invention.

As shown in FIG. 2, in an architecture 200 embodying the invention, a group of general purpose register files 202 are shown with dashed lines, and the register files are used to generate addresses of operands. There are two effective address generation units (AGEN) 204. The last effective address from these AGENs 204 are stored in temporary registers ADR REG 1 206 and ADR REG 2 208, and each newly generated effective address is compared to the address from the previous cycle at comparators 210 and 212. If the lower order seven bits of the new effective address have no carry out, then the inhibit signal is sent to the Dcache directory 214.

If the new effective addresses match the previous effective addresses, then an inhibit signal 213 is sent to the Dcache directory 214 and to the TLB 216. When the Dcache 214 receives the inhibit signal 213, the Dcache 214 is disabled and no data is fetched from the Dcache 214. Similarly, when the TLB 216 receives the inhibit signal 213, the TLB 216 is disabled and no read address is generated by the TLB 216. For the Dcache Directory with 2 ports and the TLB with 2 ports, as shown in FIG. 2, the read inhibit can be directed to each individual port.

Additionally, if the new effective addresses match the previous effective addresses, then the real addresses from he previous translation, which are stored in RA registers 218 and 220, are used without re-accessing the TLB 216 and re-translating the addresses. The system can use a 12 bit incrementer, in which a carry out from the low order seven bits indicates that the Dcache directory needs to be accessed, while a carry out from the highest order bit indicates that the TLB needs to be accessed.

The same approach can be expanded to reduce TLB translation to one per page versus one translation per cache line. To accomplish this reduction additional page comparators 222 and 224 are used to compare the upper first 52 bits of the new effective addresses with the upper first 52 bits of the previous effective addresses. If they are identical, then a translation inhibit signal 225 is sent to the TLB 216 and no translation is needed for a new page. By avoiding unnecessary Dcache Directory look ups and TLB translations, i.e., by putting these units in NOOP (no operation) condition, power is saved.

Although cache look up and TLB translation operations are not executed, the system keeps track of the effective addresses in its internal registers, and at the end of the tight loop, either through branching out from the loop or through an exception, the system restores the effective addresses back to the register files 202, so that the next instruction can be properly fetched from the Icache.

Figure 3:
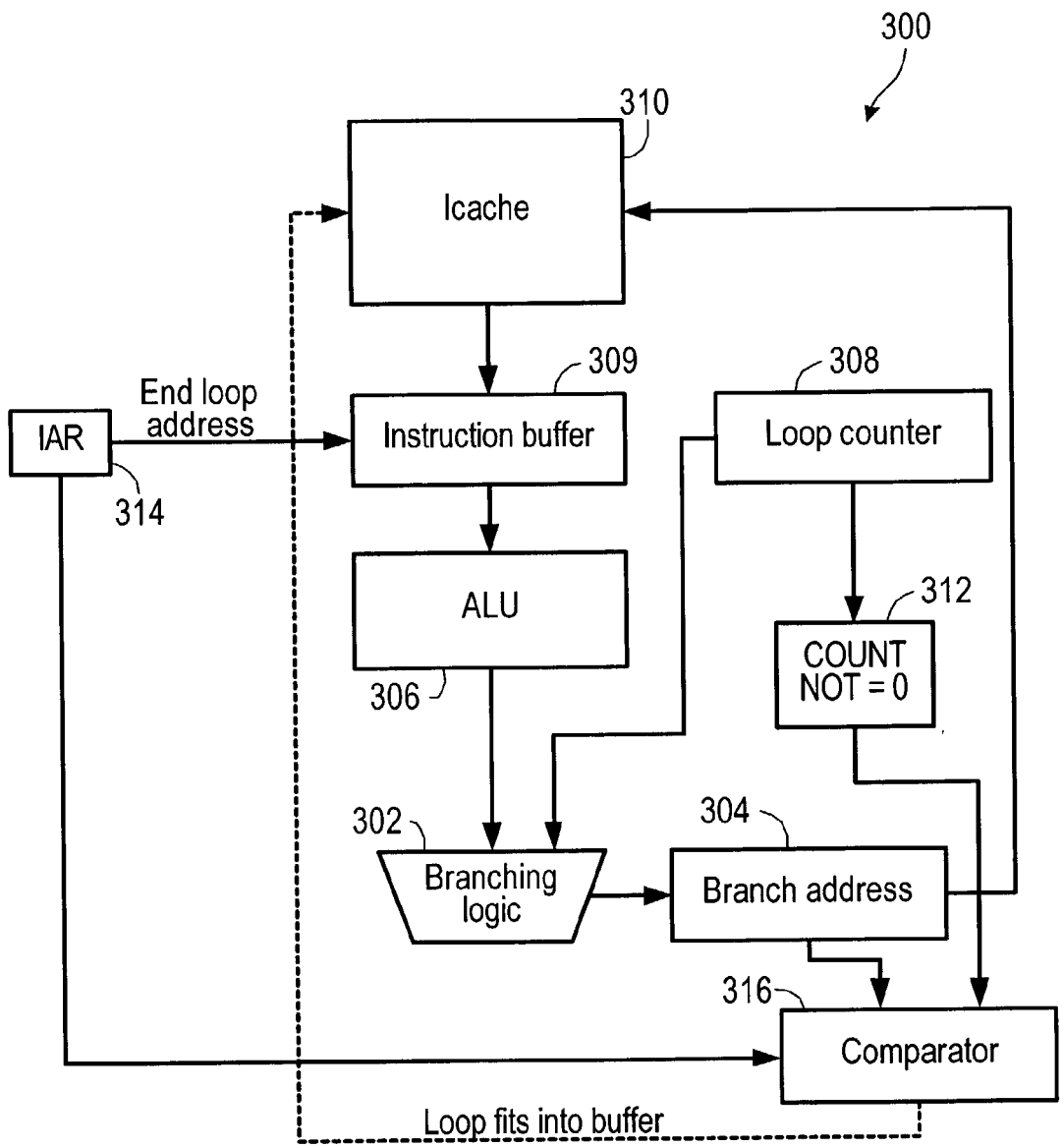
FIG. 3 is a schematic of a branching logic unit according to the present invention.

Another area where the power can be saved is the branching circuit 300, as shown in FIG. 3. The branching circuit 300 has basically two components: a branching logic unit 302 and a branching address generation unit 304. The branching logic unit 302 tests results from the arithmetic logic unit (ALU) 306 and the loop counter 308 among other conditions to determine whether to generate a branching address. The branching address generation unit 304 generates the address for the next instruction.

For the tight loop case where the instructions are in the instruction buffer 309 and will be executed for a fixed number of cycles, there is no need to fetch instructions from the Icache 310 until the end of the cycle and, consequently, there is no need to generate the address for the next instruction until the end of the cycle. Only a small portion of the branching logic unit 302 needs to be enabled to detect the end of the cycle, i.e., to detect that the loop counter 308 has reached zero and the branch address generation unit 304 can be disabled until the loop count reaches zero.

To disable certain logic elements selectively in the branching logic unit 302, the branching logic unit 302 is divided into different clock domains and those logic elements that are to be disabled are not clocked. The clock is supplied to only those logic circuits needed for the current execution. In the tight loop case, the clock is supplied only the logic that checks the loop counter 308.

A comparator 316 compares the branch address to a current value in an instruction address register (IAR) 314. A circuit 312 generates a signal indicative of whether the loop counter has a zero value. So long as the loop counter 308 is not zero and the distance between the address of the branch instruction and the branch target instruction is less than 32 words (which indicates that the loop fits within the instruction buffer), the comparator 316 disables the Icache 310, otherwise the signal from the comparator 316 is de-asserted, thereby enabling the Icache 310.

Figure 4:
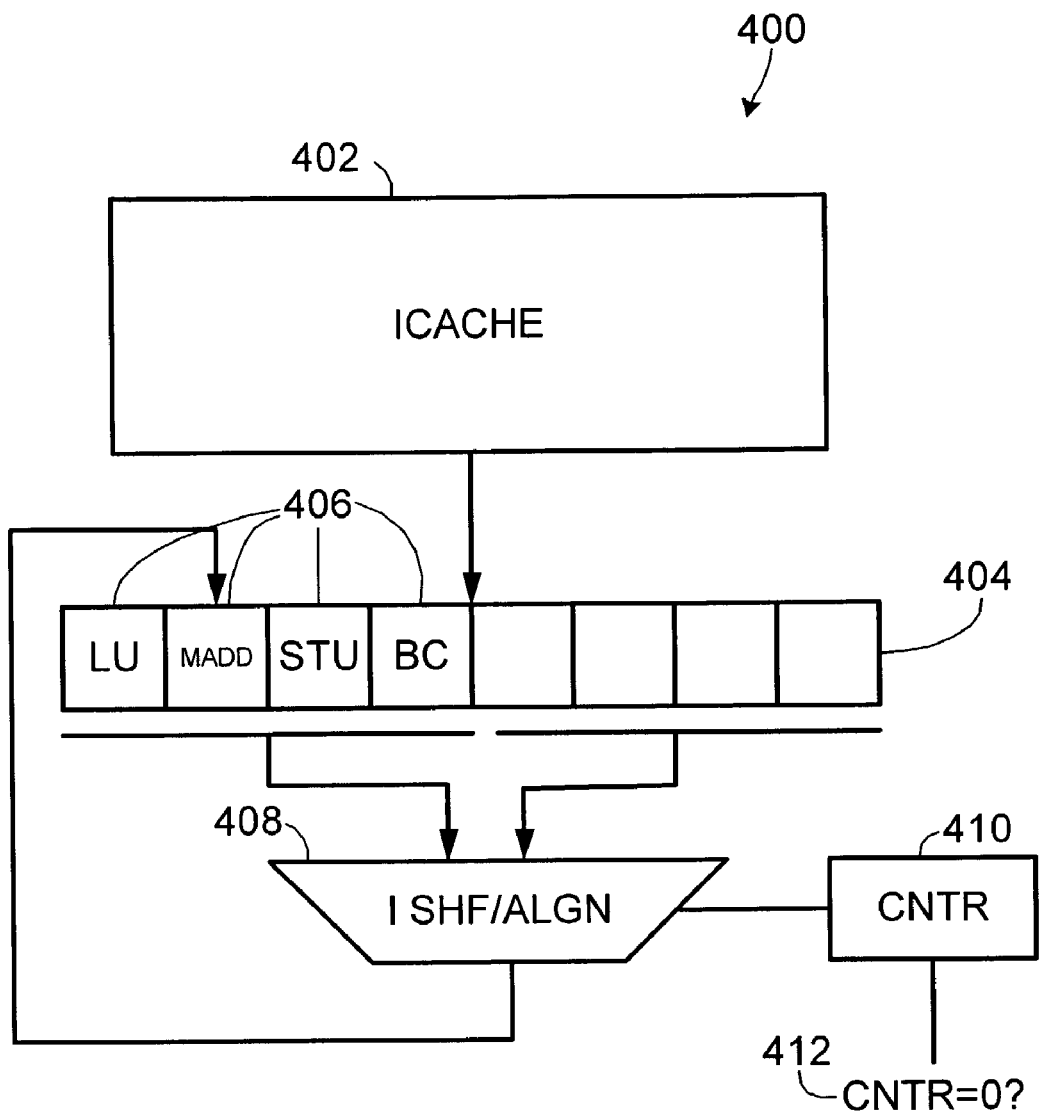
FIG. 4 is a schematic diagram of tight loop computation with all instructions in a single cache line.

FIG. 4 shows an arrangement 400 of general operations of a tight loop computation. When in the tight loop, the instructions are loaded from the Icache 402 to a register 404, where the instructions 406 are loaded and executed sequentially by an arithmetic-logic unit (ALU) 408. The ALU executes the instructions 406 repeatedly until a counter 410 gives the indication of count has reached zero 412, which indicates that the end of the loop has been reached.

The load with update (LU) instruction typically loads an operand from the Dcache into a register and increments the address register by eight bytes for the next operand. Similarly, the store with update (STU) instruction stores the result into the Dcache and increments the address register. Given that the system recognizes it is in a stride 1 tight loop situation, the system knows that the next operand is one stride away from the current operand. Therefore, the system avoids reading the address register, incrementing it by stride 1, and storing it back by incrementing a temporary register that has the address.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A system for reducing power consumption in a computing device when the computing device executes instructions in a tight loop, the system comprising:
   a data cache;
   a translation look-aside buffer;
   an effective address generation unit in communication with the data cache and the translation look-aside buffer;
   a previous effective address register that holds a previous effective address from the effective address generation unit; and
   an effective address comparator that compares a plurality of higher order bits of the new effective address to a corresponding plurality of higher order bits of the previous effective address and that generates an inhibit signal when the plurality of higher order bits of the new effective address is the same as the corresponding plurality of higher order bits of the previous effective address and when all remaining lower order bits of the new effective address have no carry out, the plurality of higher order bits of the new effective address including fewer bits than the new effective address and the plurality of higher order bits of the previous effective address including fewer bits than the previous effective address the inhibit signal inhibiting a new data fetch operation in the data cache, thereby reducing power consumed by the data cache.

2. The system of claim 1, wherein the inhibit signal is also sent to the translation look-aside buffer to inhibit real address is generation by the translation look-aside buffer.

3. The system of claim I further comprising a page comparator that compares upper bits of the new effective address to upper bits of the previous effective address.

4. The system of claim 3, wherein if the upper bits of the new effective address are the same as the upper bits of the previous effective address, then a translation inhibit signal is sent from the page comparator to the translation look-aside buffer.

5. A method for reducing power consumption by a data cache in a computing device when the computing device executes instructions in a tight loop, the method comprising the steps of:
   storing a previous effective address in a previous effective address register;
   generating a new effective address;
   comparing the new effective address with the previous effective address; and
   generating an inhibit signal when a plurality of higher order bits of the new effective address to a corresponding plurality of higher order bits of the previous effective address and that generates an inhibit signal when the plurality of higher order bits of the new effective address is the same as the corresponding plurality of higher order bits of the previous effective address and when all remaining lower order bits of the new effective address have no carry out, the plurality of higher order bits of the new effective address including fewer bits than the new effective address and the plurality of higher order bits of the previous effective address including fewer bits than the previous effective address the inhibit signal inhibiting a new data fetch operation in the data cache, therby reducing power consumed by the data cache.

6. The method of claim 5 further comprising the steps of:
   comparing upper bits of the new effective address to upper bits of the previous effective address; and
   if the upper bits of the new effective address are the same as the upper bits of the previous effective address, then sending a translation inhibit signal to the translation look-aside buffer.

* * * * *